US009794355B2

(12) United States Patent
Moghaddam et al.

(10) Patent No.: US 9,794,355 B2
(45) Date of Patent: Oct. 17, 2017

(54) SYSTEMS AND METHODS FOR ADAPTIVE NOTIFICATION NETWORKS

(71) Applicant: Samsung Electronics Co., Ltd., Suwon-si, Gyeonggi-do (KR)

(72) Inventors: Saeed Abbasi Moghaddam, San Jose, CA (US); Emmanuel Tapia, Newark, CA (US)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 0 days.

(21) Appl. No.: 14/248,183

(22) Filed: Apr. 8, 2014

(65) Prior Publication Data

US 2015/0288745 A1 Oct. 8, 2015

(51) Int. Cl.
  *G06F 17/30* (2006.01)
  *H04L 29/08* (2006.01)
  *H04W 4/02* (2009.01)

(52) U.S. Cl.
  CPC ........ *H04L 67/18* (2013.01); *G06F 17/30867* (2013.01); *H04W 4/02* (2013.01)

(58) Field of Classification Search
  None
  See application file for complete search history.

(56) References Cited

U.S. PATENT DOCUMENTS

| 6,993,417 | B2 | 1/2006 | Osann |
| 7,636,444 | B2 * | 12/2009 | Cronin ................ H04M 19/044 379/373.01 |
| 8,121,737 | B2 | 2/2012 | West et al. |
| 8,154,398 | B2 | 4/2012 | Rolf et al. |
| 8,265,776 | B2 | 9/2012 | Osann |
| 8,269,622 | B2 | 9/2012 | Chan et al. |

(Continued)

FOREIGN PATENT DOCUMENTS

| CA | 2519973 | 11/2004 |
| EP | 1798677 | 6/2007 |

(Continued)

OTHER PUBLICATIONS

Chen, Chao et al., "Design of a Wireless Sensor and Actuator Network for Energy Management at Home," 118th American Society for Engineering Education (ASEE) Annual Conference and Exposition, Jun. 26, 2011.

*Primary Examiner* — Richard Bowen

(57) ABSTRACT

In some embodiments, computer implemented methods, systems, and computer readable media can receive a notification from at least one of a plurality of notification nodes. The notification can be associated with a target user. Information related to the target user can be acquired. Information related to the plurality of notification nodes can be acquired. The plurality of notification nodes can be ranked based on at least one of the information related to the target user or the information related to the plurality of notification nodes. Then one or more notification nodes that satisfy one or more specified ranking criteria can be selected. The notification can be formatted based on at least one of the information related to the target user or information related to the one or more selected notification nodes. The formatted notification can then be transmitted to the one or more selected notification nodes.

21 Claims, 10 Drawing Sheets

(56) References Cited

U.S. PATENT DOCUMENTS

| | | | |
|---|---|---|---|
| 8,289,158 B2 * | 10/2012 | Bocking | H04M 19/04 340/384.1 |
| 8,352,546 B1 | 1/2013 | Dollard | |
| 8,375,118 B2 | 2/2013 | Hao et al. | |
| 8,412,382 B2 | 4/2013 | Imes et al. | |
| 8,429,295 B2 | 4/2013 | Vaswani et al. | |
| 8,531,294 B2 | 9/2013 | Slavin et al. | |
| 8,558,687 B2 | 10/2013 | Haupt et al. | |
| 8,823,507 B1 * | 9/2014 | Touloumtzis | H04L 67/24 340/501 |
| 8,941,500 B1 * | 1/2015 | Faaborg | G08B 21/18 340/539.11 |
| 2002/0019725 A1 | 2/2002 | Petite | |
| 2003/0069002 A1 * | 4/2003 | Hunter | G09F 27/00 455/404.2 |
| 2003/0233155 A1 * | 12/2003 | Slemmer | G05B 13/028 700/13 |
| 2004/0054747 A1 | 3/2004 | Breh et al. | |
| 2006/0045105 A1 | 3/2006 | Dobosz et al. | |
| 2007/0214228 A1 | 9/2007 | Horvitz et al. | |
| 2007/0224586 A1 * | 9/2007 | Massie | G09B 5/00 434/350 |
| 2008/0280562 A1 | 11/2008 | Zebic et al. | |
| 2009/0305744 A1 | 12/2009 | Ullrich | |
| 2012/0054125 A1 | 3/2012 | Clifton et al. | |
| 2012/0310961 A1 * | 12/2012 | Callison | G06F 17/30867 707/756 |
| 2012/0319840 A1 | 12/2012 | Amis | |
| 2013/0054863 A1 | 2/2013 | Imes et al. | |
| 2013/0325922 A1 * | 12/2013 | Chaudhri | G06Q 10/10 709/203 |
| 2014/0074921 A1 * | 3/2014 | Poornachandran | G06F 17/30867 709/204 |
| 2014/0141816 A1 * | 5/2014 | Winkler | H04W 88/02 455/457 |
| 2014/0149538 A1 * | 5/2014 | Deeter | H04L 67/26 709/217 |
| 2014/0257877 A1 * | 9/2014 | L'Heureux | G06Q 30/06 705/5 |
| 2014/0304363 A1 * | 10/2014 | Mhatre | H04L 67/26 709/217 |
| 2014/0327544 A1 * | 11/2014 | Ramsdell | G08B 21/24 340/573.1 |
| 2015/0141063 A1 * | 5/2015 | Lawless | H04L 1/08 455/466 |

FOREIGN PATENT DOCUMENTS

| | | |
|---|---|---|
| WO | 2005107408 | 11/2005 |
| WO | 2012011630 | 1/2012 |

* cited by examiner

SYSTEMS AND METHODS FOR ADAPTIVE NOTIFICATION NETWORKS

FIELD OF THE INVENTION

The present technology relates to the field of notifications. More particularly, the present technology discloses an adaptive notification network.

BACKGROUND

Conventional approaches to providing a notification, such as an alert, to a user can include displaying a visual indicator or playing a sound on a computing device of the user. In one example, the computing device (e.g., smart phone, tablet computer, laptop computer, desktop computer, etc.) can notify the user of a missed phone call by displaying a message indicating that the user did not pick up a call from a certain caller at a certain time. In another example, a text message can be received at the computing device and the computing device can provide a notification to the user by playing an audible sound (e.g., beep, ring, etc.), by turning on a light indicator (e.g., a light emitting diode (LED) indicator), and/or by vibrating the computing device. In a further example, the computing device can receive a public communication (e.g., fire alert, police alert, emergency response alert, etc.) and cause the user to be notified via a message displayed on the computing device.

However, conventional approaches to providing notifications to users can be limited. Many users miss, ignore, or otherwise fail to recognize the notifications provided to them. For example, a user's computing device can provide a notification when the user is not near the device. In another example, a user can be in a noisy environment such that an audible notification produced by the computing device is not heard by the user. In a further example, a user can have difficulty reading a displayed message produced by the computing device (e.g., due to small text, due to the user's capabilities, etc.).

For the foregoing reasons, it is desirable to provide a notification to an intended user in an appropriate manner. It is desirable to provide a notification that can have a higher likelihood of being acknowledged, observed, understood, or otherwise recognized by the user. It can also be desirable to provide multiple notifications to the user in order to increase the likelihood that the user will recognize at least some of the notifications. Furthermore, it can be desirable to provide a notification in a manner that is dependent upon the user and/or the environment in which the user is situated.

SUMMARY

To utilize an adaptive notification network, computer implemented methods, systems, and computer readable media, in an embodiment, can receive a notification from at least one of a plurality of notification nodes. The notification can be associated with a target user. Information related to the target user can be acquired. Information related to the plurality of notification nodes can also be acquired. The plurality of notification nodes can be ranked based on at least one of the information related to the target user or the information related to the plurality of notification nodes. Then one or more notification nodes that satisfy one or more specified ranking criteria can be selected. The notification can be formatted based on at least one of the information related to the target user or information related to the one or more selected notification nodes. The formatted notification can then be transmitted to the one or more selected notification nodes.

In one embodiment, at least one of ranking the plurality of notification nodes, selecting the one or more notification nodes, or formatting the notification can be performed dynamically.

In one embodiment, a communication can be received. The communication can indicate that information related to one or more of the plurality of notification nodes has changed. The information related to the one or more of the plurality of notification nodes can be updated based on the communication.

In one embodiment, the information related to the plurality of notification nodes can indicate at least one of a current context of each of the plurality of notification nodes or a notification capability of each of the plurality of notification nodes.

In one embodiment, the information related to the target user can include a current context in which the target user is situated.

In one embodiment, the current context in which the target user is situated can indicate at least one of a current location of the target user, a current environment in which the target user is situated, a noise level of the current environment in which the target user is situated, or an ambient light level of the current environment in which the target user is situated.

In one embodiment, the current location of the target user can be a relative location with respect to one or more locations of at least a subset of the plurality of notifications nodes.

In one embodiment, the current location of the target user can be determined using, at least in part, one or more sensors of at least a subset of the plurality of notification nodes.

In one embodiment, formatting the notification can further comprise preparing the notification to be audibly provided to the target user when the noise level of the current environment is below a specified noise level threshold, or preparing the notification to be visually provided to the target user when the ambient light level of the current environment is below a specified ambient light level threshold.

In one embodiment, the information related to the target user can include at least one of an age of the target user, one or more capabilities of the target user, one or more preferred languages of the target user, or one or more preferences of the target user.

In one embodiment, a communication can be received. The communication can indicate that information related to the target user has changed. The information related to the target user can be updated based on the communication.

In one embodiment, feedback from the target user can be received. The information related to the target user can be updated based on the feedback.

In one embodiment, the notification server can correspond to at least one of the plurality of notification nodes.

In one embodiment, the formatted notification can be transmitted to a computing device designated by the target user.

Many other features and embodiments of the invention will be apparent from the accompanying drawings and from the following detailed description.

Figure 1:
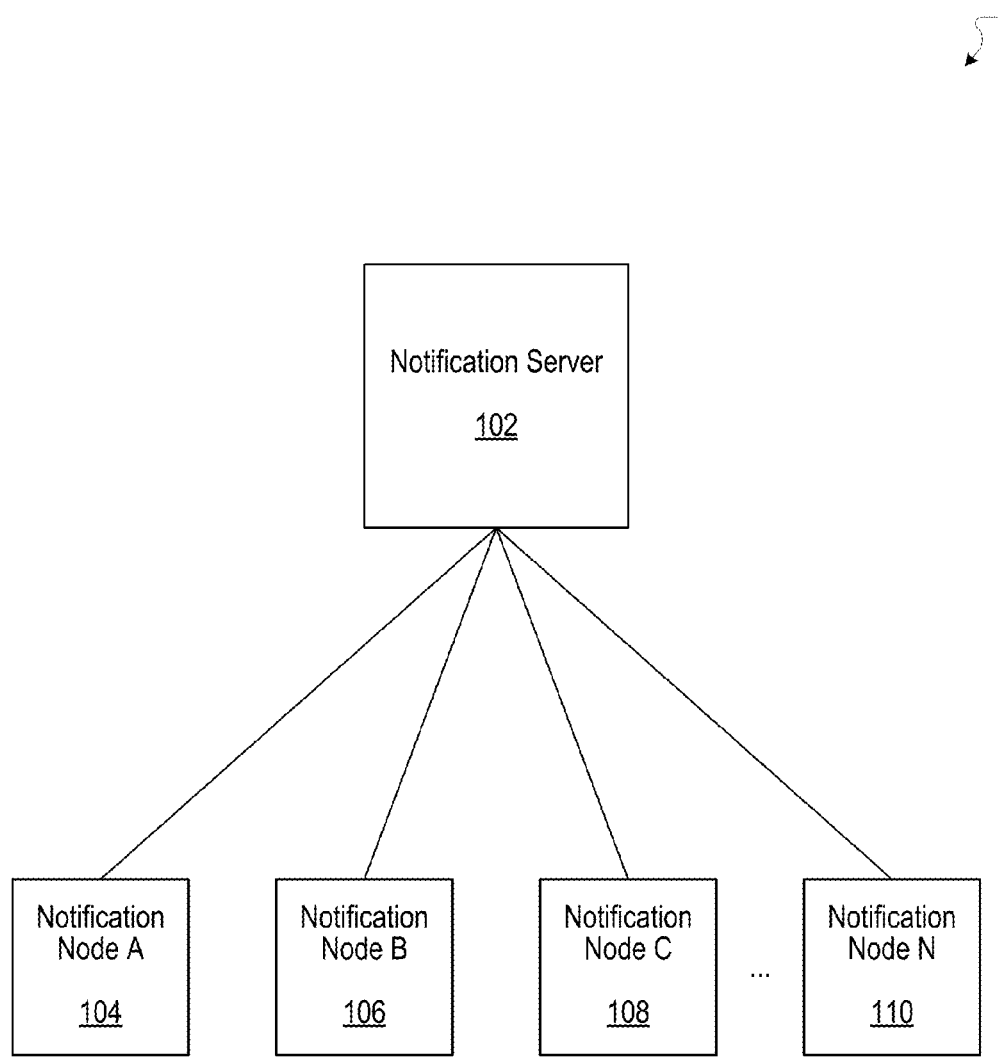
FIG. 1 illustrates an example system embodiment for an example adaptive notification network, according to an embodiment of the present disclosure.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Adaptive Notification Networks

Often times, people receive notifications on their computing devices. Notifications can include (but are not limited to) alerts, reports, announcements, or various other communications. Computing devices can provide notifications to users of the computing devices, for example, via a visual indicator (e.g., displaying a message, showing an icon, flashing an indicator light, etc.), via an audible sound (e.g., beep, ring, spoken message, etc.), and/or via tactile or haptic feedback (e.g., vibration, rumble, etc.). In some cases, a notification can indicate to a user that the user has received an email, text message, incoming call, reminder, calendar event, etc. In some cases, a notification can inform a user about a fire alert, police alert, emergency response alert, etc. As such, in at least some situations, a notification can be important to the user.

However, people frequently miss, ignore, or are unaware of notifications provided to them. In one example, a user of a computing device can be away from his or her device when the notification is provided. In another example, the user can be in a noisy environment when the computing device provides an audible notification, such that the user does not hear the notification. In a further example, the user can be sitting in a car during a bumpy ride such that the user does not feel a vibrating notification provided by the computing device.

To address at least some of these concerns, various embodiments of the present disclosure can take into account information about particular users as well as information about particular notification nodes and, as a result, dynamically adapt to users and notifications nodes when providing notifications. This can increase the likelihood that a notification can be successfully provided to an intended user via a suitable medium, such that the intended user will recognize or become aware of the notification.

FIG. 1 illustrates an example system embodiment for an example adaptive notification network 100, according to an embodiment of the present disclosure. The example adaptive notification network 100 can include a notification server 102 and one or more notification nodes, such as Notification Node A 104, Notification Node B 106, Notification Node C 108, Notification Node N 110, and so forth. It is contemplated that the quantity of notification nodes in the example adaptive notification network 100 can vary. Moreover, communications among the notification server 102 and the notification nodes can be achieved via a network medium, such as a local area network (LAN), a wireless LAN (WLAN), a personal area network (PAN), Bluetooth, and/or various other communication mediums/protocols. Furthermore, in some cases, the operating systems of the notification server 102 and the notification nodes can be configured to be operable with the adaptive notification network 100. In some cases, applications can be installed and run on the notification server 102 and the notification nodes to enable operation with the adaptive notification network 100.

In some embodiments, the example adaptive notification network 100 can correspond to a local notification network and the notification server 102 can correspond to a dedicated server in the local adaptive notification network. For example, the notification server 102 can be a local computing device configured to communicate with the notification nodes in the adaptive notification network 100.

In some embodiments, the adaptive notification network 100 can correspond to an ad-hoc network, such that a preconfigured network infrastructure is not required. In some cases, a notification node can be selected to serve as a coordinator node (i.e., notification server) to coordinate the other nodes and/or manage the notification network 100.

Furthermore, in some embodiments, the notification server 102 can correspond to one or more servers remote or separate from the notification nodes. The notification server 102 can correspond to one or more servers running in the "cloud" (e.g., Internet, real-time communication network, etc.). In one example, the notification server 102 can correspond to a virtual server running in the cloud. In this example, communications between the virtual server and the notification nodes can occur via the cloud.

With regard to the notification nodes (e.g., Notification Node A 104, Notification Node B 106, Notification Node C 108, Notification Node N 110, etc.), each notification node can correspond to a computing device. In some cases, a computing device can include a device or system having at least one processor and being configured to communicate with a network. In one example, a notification node can correspond to a smart phone, a tablet computer, a laptop computer, a desktop computer, a smart television (i.e., a network connected television having at least one processor), a gaming system, an electronic gadget (e.g., toy robot), a smart appliance (e.g., refrigerator, microwave oven, toaster, oven, stove, washer, dryer, etc.), a plant monitor, a utility meter, a wearable device (e.g., smart watch, smart glasses, NFC ring, etc.), or any other device or system having at least one processor and capable of communicating with the adaptive notification network 100.

In some embodiments, a notification node can be configured to provide a notification, such as an alert, message, or other communication, to a user. The user for which the notification is intended can be referred to as the target user. Moreover, there can be notifications that vary in type, content, format, etc. For example, a smart phone notification node can display a message notification to a target user indicating that there is an incoming phone call for the target user. In another example, a tablet computer notification node can vibrate to remind a target user about a calendar event.

In addition, different notification nodes can also have different notification capabilities. In some cases, notification nodes can visually provide notifications, such as by displaying a viewable message or operating (e.g., turning on, flashing, etc.) an indicator light. In some instances, notification nodes can audibly provide notifications, such as by playing a vocalized message or a sound (e.g., beep, ring, etc.). Further, in some cases, notification nodes can provide notifications in a tactile or haptic manner, such as by generating one or more vibrations.

However, often times, the notification for the target user is not seen, heard, felt, perceived, acknowledged, or otherwise recognized by the target user. In an example scenario, the target user might be away from his or her smart phone, tablet computer, etc., such that the user does not see or hear the notification. In another example scenario, the user's smart phone, tablet computer, etc., might be in a backpack or bag such that the user does not feel any vibrations produced. In these and other scenarios, the notifications intended for the target user might not be recognized (e.g., perceived, acknowledged, etc.) by the target user. Accordingly, the example adaptive notification network 100 of the present disclosure attempts to increase the likelihood that a notification will be recognized by the target user. The example adaptive notification network 100 can take into consideration information related to particular target users and information related to particular notification nodes to dynamically decide how to provide notifications to target users. For example, the adaptive notification network 100 can dynamically select one or more appropriate or suitable notification nodes at which to provide the notifications.

Figure 2A:
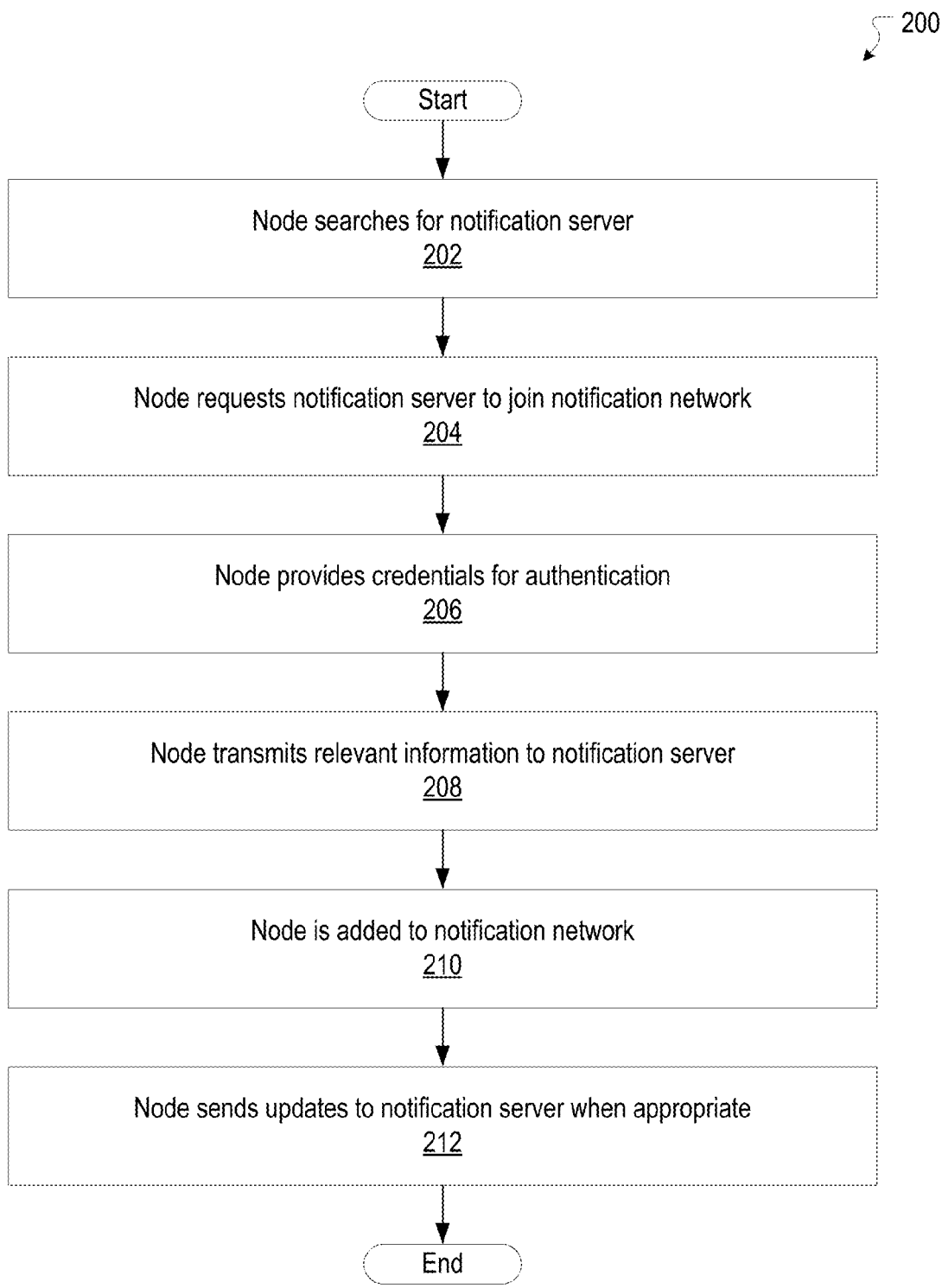
FIG. 2A illustrates an example flowchart for adding and maintaining a notification node with respect to an adaptive notification network, according to an embodiment of the present disclosure.

As discussed previously, the adaptive notification network 100 can be implemented with the notification server 102 and one or more notification nodes (e.g., 104, 106, 108, 110, etc.). Turning now to FIG. 2A, an example flowchart 200 for adding and maintaining a notification node (e.g., 104, 106, 108, or 110 in FIG. 1) with respect to an adaptive notification network (e.g., 100 in FIG. 1) is illustrated, according to an embodiment of the present disclosure.

In FIG. 2A, the notification node can search for a notification server (e.g., 102 in FIG. 1) associated with the adaptive notification network, at step 202. Upon discovery of the notification server, the notification node can request the notification server for the node to join the notification network, at step 204. Additionally or alternatively, the notification server can detect new notification nodes that are compatible with the notification network and invite the new nodes to join the notification network. As such, the notification server can frequently listen for new requests and/or attempt to detect new nodes.

When the notification node is in the process of joining the notification network, the notification node can provide its credentials to the notification server for authentication purposes, at step 206, such that the server can confirm that the respective notification node is permitted to join the notification network. For example, the notification server can verify that the node is on the same network connection (e.g., same WiFi or LAN network) as the server. In another example, the server can send a passcode to another already authenticated node and ask a user to enter the passcode on the node being authenticated. Various other approaches to authenticating notification nodes can be utilized.

Subsequent to being authenticated, the notification node can provide to the notification server certain relevant information related to the node, at step 208. The information related to the notification node can include, but is not limited to, information about a context in which the notification node is situated, information about notification capabilities of the notification node, and information about communication preferences and other settings of the notification node. The information about the context of the notification node can indicate a location of the notification node. In some cases, the location can correspond to a relative location of the notification node with respect to a reference point (e.g., the notification server, another notification node(s), etc.). In some instances, the location can correspond to an absolute location of the notification node (e.g., physical address, Global Positioning System (GPS) coordinates, etc.). The information about the context of the notification node can also indicate an environment in which the notification node is situated (e.g., at home, at work, in a park, in a theater, in a vehicle, etc.). In some cases, information about the environment, such as a noise level and/or an ambient light level associated with the environment, can also be provided.

Moreover, the information related to the notification node can specify what notification capabilities the notification node has (and does not have). For example, the information can specify that the notification node has a display screen capable of presenting visual (e.g., text) notifications, an indicator light capable of providing visual (e.g., optical) notifications, a speaker capable of providing audible notifications, and/or a motor capable of producing vibrations or other haptic feedback.

Having acquired (e.g., obtained, received, etc.) the information related to the notification node that is joining the network, the notification server can store the information related to the notification node in a data store, along with information related to other notification nodes in the network. The notification node can be added to the notification network, at step 210. The notification node can also provide information updates to the server when appropriate (e.g., over time), at step 212. For example, if the current location of the notification node changes, the node can provide information about its new current location to the server. In another example, if the communicational preferences of the notification node changes, the node can provide updated information about the changed communication preferences.

Using the information related to the notification nodes, when a notification is to be provided to a target user, the server can, dynamically and adaptively (and automatically), rank all of the notification nodes in the network and select one or more nodes that are best suited to provide the notification to the target user.

Figure 2B:
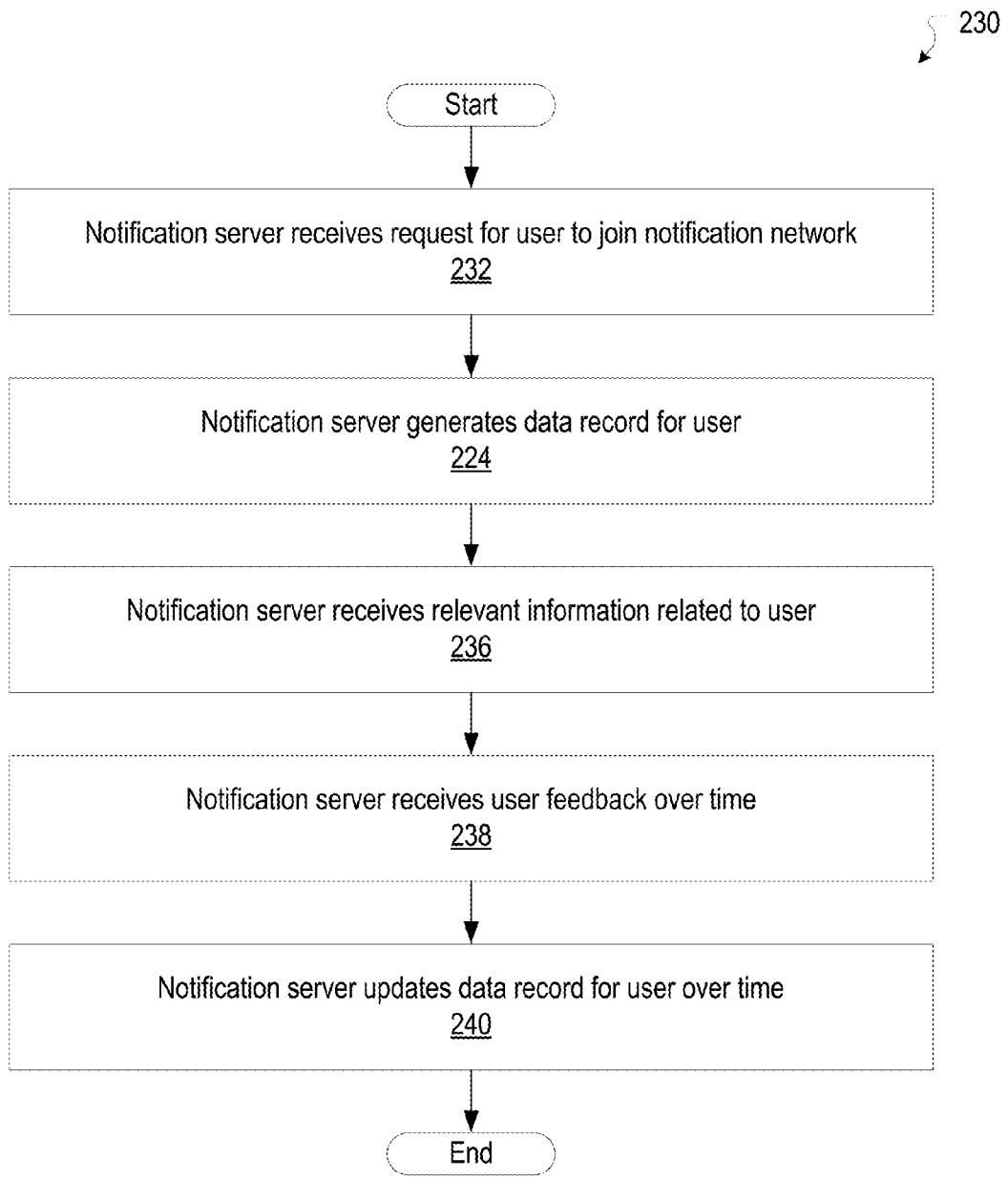
FIG. 2B illustrates an example flowchart for generating and maintaining a data record for a user in an adaptive notification network, according to an embodiment of the present disclosure.

Furthermore, various embodiments of the present disclosure can enable the notification server to utilize information related to target users. Referring now to FIG. 2B, an example flowchart 230 for generating and maintaining a data record (or data entry) for a user in an adaptive notification network (e.g., 100 in FIG. 1) is shown, according to an embodiment of the present disclosure. The adaptive notification network can dynamically and adaptively provide notifications to target users based on information related to the target users. A user can utilize the adaptive notification network when he or she joins (e.g., connects to, subscribes to, becomes associated with, etc.) the adaptive notification network. At step 232, a notification server (e.g., 102 in FIG. 1) can receive a request for the user to join the notification network. In some embodiments, the user can acquire (e.g., download, install, etc.) an application configured to work in conjunction with the notification network. The user can then join the notification network via the application. In some embodiments, the notification server or a notification node can provide an interface for the user to join the notification network. In some embodiments, the user can utilize a web resource or other service to join the notification network.

At step 234, the notification server can generate a data record (or data entry) for the user. The data record can correspond to a profile for the user and can store information related to the user. Step 236 can involve the notification server acquiring (e.g., receiving, obtaining, etc.) relevant information related to the user. The information related to the user can be stored at the data record associated with the user. The information related to the user can indicate the user's age, settings or preferences, preferred language(s), capabilities (e.g., disabilities), etc. The information can also include information about a context in which the user is situated, such as a current location of the user or a current environment in which the user is situated. In some embodiments, the information can be provided by the user via an application, service, or other interface associated with the notification network. In some embodiments, the information related to the user can be provided by a computing device (e.g., a notification node) associated with the user.

In one example, the context (e.g., location, environment, background noise level, ambient light level, etc.) of the target user can correspond to the context of the computing device associated with the user. As such, the computing device can provide data about the device's context to represent data about the context of the target user. (The data about the device's context can be acquired by the device using various sensors, meters, chips, and/or components of the device.) In another example, the computing device associated with the user can already have access to data about the user's age, preferred language, and/or other settings/preferences. As such, if the user permits, the computing device can provide this data to the notification server. Furthermore, when the information related to the target user changes, the notification server can acquire (e.g., receive) updated information related to the target user.

When a notification is to be provided to a target user (assuming that the target user has joined the notification network), then the notification server can decide how to provide the notification to the target user based on the information related to the target user (which can be stored in the data record for the target user) and/or based on information related to the notification nodes in the network. The notification server can rank the notification nodes based on the information related to the target user and/or the information related to the nodes. The server can select one or more highly ranked nodes that are likely to successfully provide the notification, such that the target user is likely to recognize (e.g., acknowledge, receive, perceive, become aware of, etc.) the notification. The server can also format the notification for each selected node and/or instruct each selected node regarding how to deliver the notification (e.g., play a sound, present a visual element, etc.).

Subsequent to providing the notification, in some embodiments, the notification server can acquire feedback from the user, at step 238. For example, if the user ignores or does not respond to the notification provided, then the notification server can learn that the ranking/selecting of the nodes and/or the formatting of the notification might need to be improved. In another example, if the user responds or reacts (e.g., answers an incoming call, views a text message, etc.) quickly or within an allowable time period, then the notification server can observe that the ranking/selecting of the nodes and/or the formatting of the notification produced a desirable result.

As the notification server receives user feedback over time, the notification server can update the data record for the user, including the information related to the user, at step 240. Moreover, if the information related to the user changes, the information related to the user can be updated as well. Consequently, the notification network can improve over time.

Figure 2C:
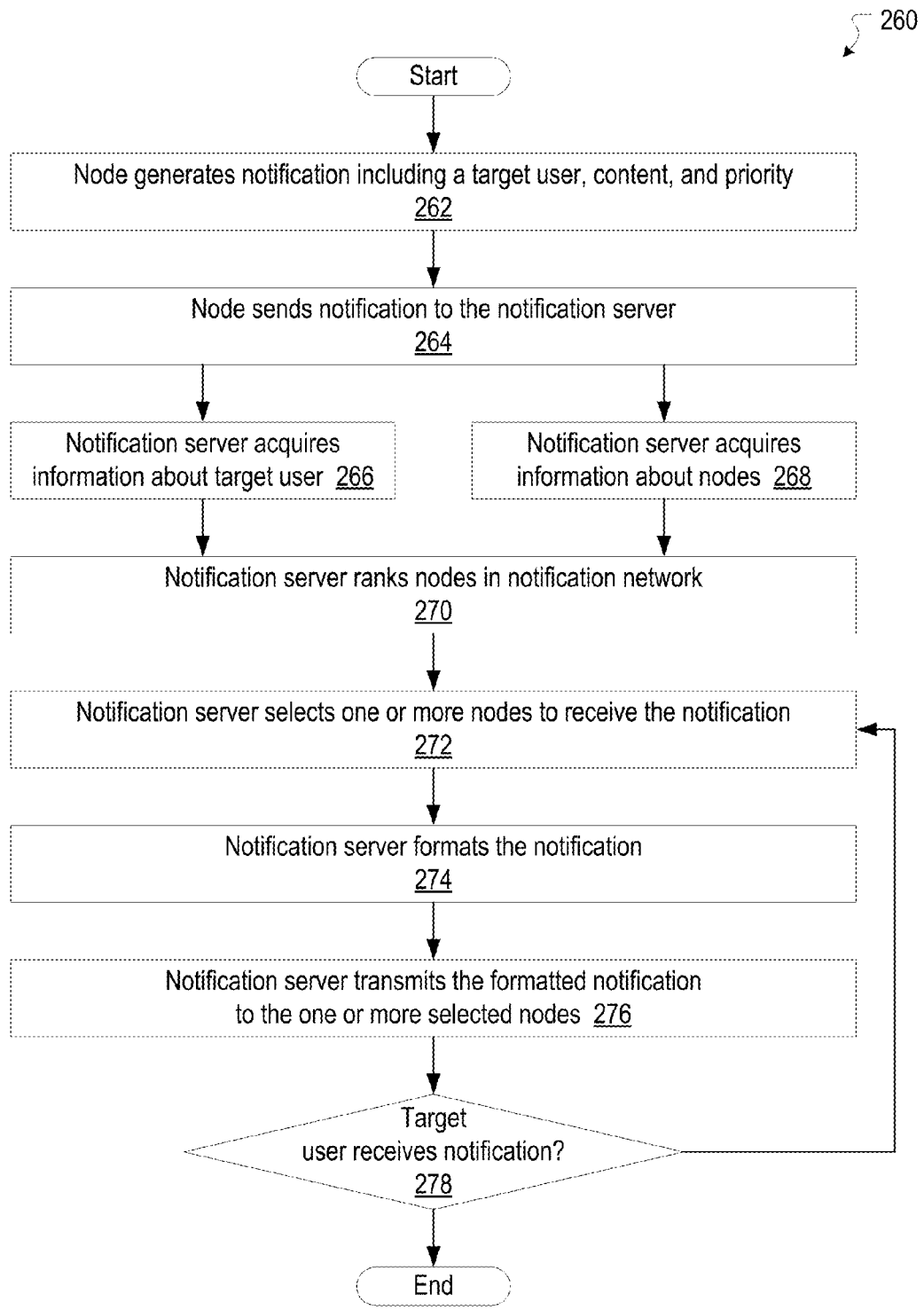
FIG. 2C illustrates an example flowchart for utilizing an adaptive notification network to provide a notification to a target user, according to an embodiment of the present disclosure.

FIG. 2C illustrates an example flowchart 260 for utilizing an adaptive notification network (e.g., 100 in FIG. 1) to provide a notification to a target user, according to an embodiment of the present disclosure. At step 262, a notification node (e.g., 104, 106, 108, 110 in FIG. 1) can generate a notification intended for a target user. The notification can include data identifying the target user, contents of the notification, and a priority for the notification. For example, the notification can be an indication of an incoming call for John, such that John is the target user. The notification content can be an indication of an incoming call (perhaps also indicating the caller identification). In this example, the priority for the notification can be medium (e.g., average, priority 5 out of 10, etc.). In another example, the notification can be a public emergency response alert (e.g., fire alert, police alert) in the form of a text message. The target user can be John, an intended recipient of the public alert. The content can include the message of the alert (e.g., "PUBLIC ALERT: there is a wild fire near your neighborhood."). The priority of the notification can be high, since this can potentially be a very important message. In some cases, the priority of the notification can enable the notification server to decide how to deliver the notification. For example, the notification server can instruct a node to emphasize a high priority notification when providing the notification. In another example, the notification server can decide to deliver the higher priority notification first and then a lower priority notification. In a further example, the notification server can decide not to deliver lower priority notifications.

Continuing with FIG. 2C, the notification node can send the notification, including the identity of the target user, contents of the notification, and priority data, to a notification server (e.g., 102 in FIG. 1), at step 264. The notification server can parse the information included with the notification and can determine the identity for the notification node sending the notification as well as the identity of target user for which the notification is intended.

At step 266, the notification server can acquire information related to (or about) the target user. The notification server can also acquire information related to (or about) all of the notification nodes in the adaptive notification network, at step 268. In some embodiments, steps 266 and 268 can be performed substantially simultaneously, such as via parallel processing. In some cases, steps 266 and 268 can be performed sequentially, one after the other (in any order).

As discussed previously, the information related to the target user can be inputted by the target user and/or determined by a computing device (e.g., a notification node) associated with the target user. Moreover, the information related to the notification nodes can be provided by the notification nodes. For example, the information related to the nodes can indicate a location for each of the nodes, an environment of each node, each node's notification capabilities, etc. Furthermore, as discussed above, the information related to the target user and the information related to the nodes can change over time. As such, the notification server can acquire (e.g., receive from target users, receive from nodes, etc.) the most recent information, thereby enabling the notification network to adapt to any updates/changes in information related to the target user and/or to the notification nodes.

Based on the information related to the target user and/or to the notification nodes, the notification server can adaptively and dynamically rank the nodes, at step 270. The nodes can be ranked, for example, in terms of how likely a node can successfully provide the notification to the target user. In some cases, since the notification server has access to information related to the target user and information related to the nodes, such as information about the target user's location and information about the locations of the nodes, the notification server can determine which nodes are closest to the target user and rank those nodes higher than other nodes. In some instances, the notification server can also factor in other information related to the target user, such as the target user's environment, background noise level, ambient light level, age, capabilities, preferred language(s), and/or other preferences. Further, the notification server can also factor in other information related to the nodes, such as the nodes' capabilities for providing notifications, in order to determine the nodes that are best suited to provide the notification to the target user. For example, if the information related to the target user indicates that the target user is hearing-impaired, then the notification server can access the information related to the nodes and rank higher the nodes that can produce visual notifications and/or tactile/haptic notifications. Other approaches and techniques for ranking the notification nodes based on information related to the target user and/or information related to the notification nodes may be implemented. For example, the notification nodes may be ranked by user preference, length of user engagement time with each notification node, etc.

Having ranked the notification nodes, the notification server can select the highest ranked nodes (or nodes that satisfy one or more specified ranking criteria), at step 272. In some cases, the server can select a specified quantity of highest ranking nodes (e.g., top node, top three nodes, etc.). In some embodiments, the ranking of the nodes can result in each node having a score, such that the server can select all nodes that satisfy a specified rank score threshold.

At step 274, the notification server can format the notification. The formatting of the notification can be based on the information related to the target user and/or on the information related to the selected notification nodes. The notification server can format the notification such that the notification can be provided to the target user in an appropriate or desirable manner. Continuing with the previous example, if the information related to the target user indicates that the target user is hearing-impaired, then the notification server can format the notification to be delivered as a visual notification, a tactile/haptic notification, and/or an audible notification having an increased volume.

Step 276 can involve the notification server transmitting the formatted notification to the one or more selected nodes. The transmission of the formatted notifications can be achieved via various communication mediums operable with the network. In some embodiments, at step 278, the notification server can determine whether or not the target user has recognized or acknowledged the notification. For example, if the notification indicates an incoming call, then the server can determine that the target user has recognized the notification if the target user answers the call (e.g., presses a button to "Answer Call") or elects to intentionally ignore the call (e.g., presses a button for "Do Not Pick Up"). If it is determined that the target user did not recognize the notification, then the notification server can loop back to step 272 to select the next highest ranked notification node(s).

Additionally, in some embodiments, if desirable results have not been produced (i.e., if a notification is not successfully delivered to and/or recognized by the target user), then the notification server can loop back to step 270 to re-rank the notification nodes. Further, in some embodiments, if desirable results have not been produced, the notification server can loop back to steps 266 and 268 to acquire the most recent information related to the target user and/or the nodes.

Figure 3A:
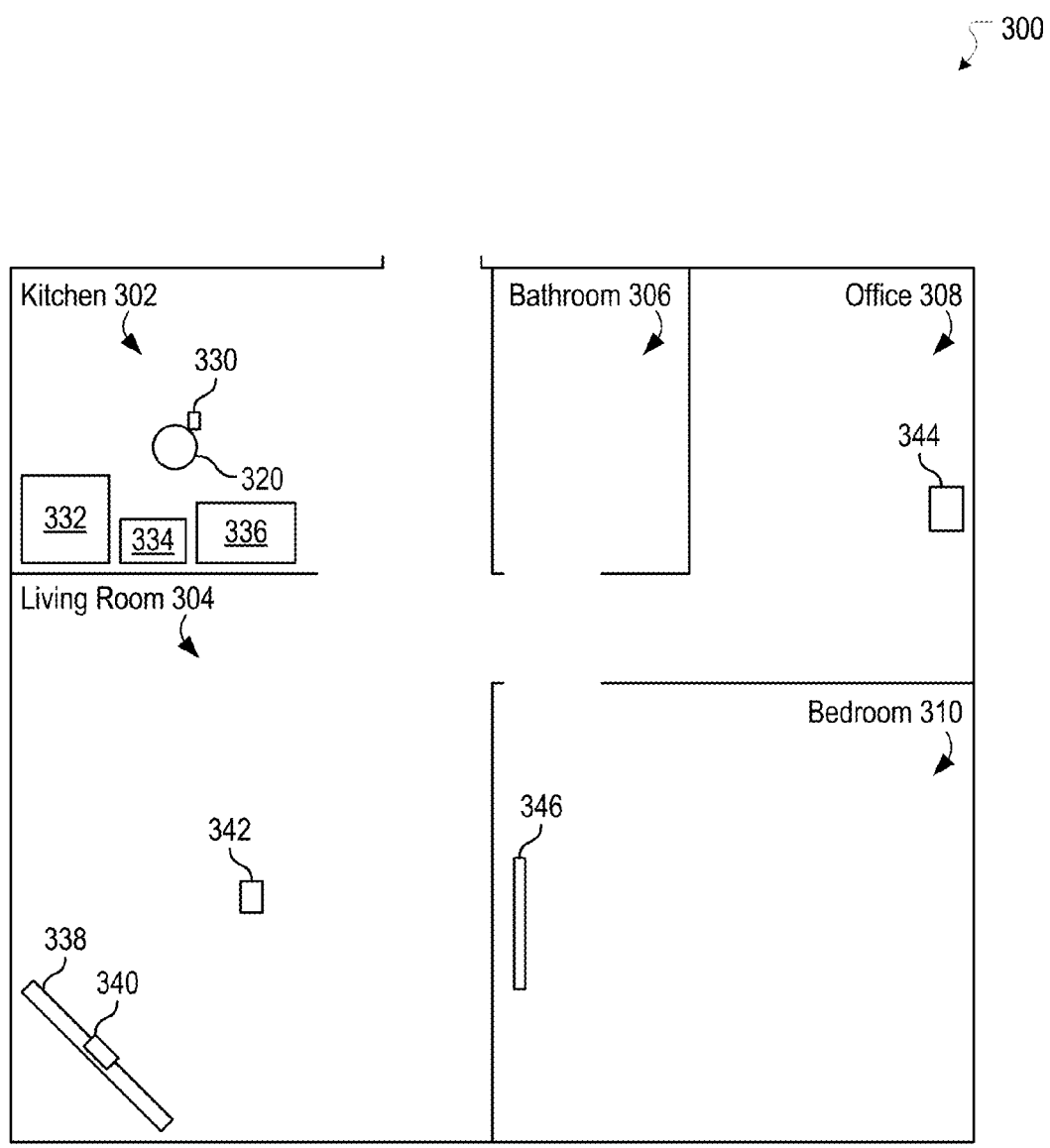
FIG. 3A illustrates an example scenario in which an example adaptive notification network can be utilized, according to an embodiment of the present disclosure.

FIG. 3A illustrates an example scenario 300 in which an example adaptive notification network can be utilized, according to an embodiment of the present disclosure. The example scenario 300 can correspond to a home. FIG. 3A illustrates how an example adaptive notification network can be implemented and utilized within a home of a user(s). In the example home scenario 300, the home can include a kitchen 302, a living room 304, a bathroom 306, an office 308, and a bedroom 310. As shown, there can also be a user 320.

In the example of FIG. 3A, the adaptive notification network can be formed by a notification server and one or more notification nodes. The notification server can be remote (e.g., in the cloud) or local (e.g., a designated device/system, a coordinator node, etc.). With reference to FIG. 3A, the notification server can be a remote server that is not explicitly shown. The one or more notification nodes can correspond to devices or systems that have at least one processor and are capable of network communication. As shown in the example home 300 scenario, the user 320 can have a smart phone 330. The kitchen 302 can include a refrigerator 332, a microwave oven 334, and a stove (i.e., range, cooker, oven) 336. The living room 304 can include a television (TV) 338, a media entertainment system 340 (e.g., disc player, cable box, set top box, media streaming system, video game console, etc.), and a tablet computer 342. The office 308 can include a laptop or desktop computer 344. The bedroom 310 can include another TV 346. These devices (or systems) can be "smart" in that they can have processors as well as network communication capabilities. Each of these devices can be a notification node in the adaptive notification network and can generate respective notifications as well as provide notifications to users.

Also, the notification nodes can each have various sensors, meters, monitors, or other components. In some cases, the notification nodes can also comprise proximity sensors, cameras, microphones, speakers, indicators lights, and various other components. For example, the refrigerator 332 can be a smart refrigerator having at least processor, an operating system, applications, a touch display screen, network capabilities, etc. Similarly, the microwave oven 334 and the stove 336 can be smart appliances as well.

In the example home scenario 300, the notification server can acquire and store information related to the notification nodes, such as locations (absolute or relative) of the nodes, contexts of the nodes, capabilities of the nodes, etc. The notification server can have access to information indicating that the refrigerator 332 is in the kitchen 302, that the microwave oven 334 is in the kitchen 302, that the stove 336 is in the kitchen 302, and so forth. In this example, the notification server can also acquire information indicating that the user 320 is in the kitchen 302, such as by acquiring information indicating that the location of the user's smart phone 330 is in the kitchen 302. In some cases, the notification server can also acquire information indicating that the user 320 is in the kitchen 302 by acquiring information indicating that the location of the user's wearable or other device (e.g., smart watch, smart glasses, smart ring, etc.) is in the kitchen 302. In addition, in this example, the notification server can acquire information indicating that the user is near-sighted. Furthermore, the notification can acquire information indicating that the refrigerator 332, the microwave 334, and the stove 336 each have a display screen larger than that of the smart phone 330.

Continuing with the example, the refrigerator 332, the microwave oven 334, the stove 336, and the smart phone 330 can be ranked relatively higher by the notification server due to their locations being closer in proximity to the user's location. In contrast, the office computer 344 and the bedroom TV 346 can be ranked relatively lower.

In this example, if a notification (e.g., incoming text message) is generated by the tablet computer 342, then the user 320 would likely not receive the notification because the user 320 is in the kitchen 302 while the tablet computer 342 is in the living room 304. However, since the tablet computer 342 is a node in the notification network, the tablet 342 can transmit the notification to the notification server. The transmission of the notification can include information specifying that the user 320 is the intended target user and that the priority of the notification is medium or average. If there are no other higher prioritized notifications, the notification server can decide to provide this notification to the user 320.

Having ranked the nodes, the notification server can select one or more nodes to provide the notification from the tablet 342. In this example, the refrigerator 332, the microwave oven 334, the stove 336, and the smart phone 330 can be among the highest ranked nodes. Moreover, since the notification server knows that the user 320 is near-sighted and that the refrigerator 332, the microwave 334, and the stove 336 each have a larger display screen than that of the smart phone 330, the refrigerator 332, the microwave 334, and the stove 336 can be ranked higher than the smart phone 330. As such, the notification server can select the refrigerator 332, the microwave 334, and the stove 336 to be the notification nodes at which to provide the notification from the tablet 342.

The notification server can subsequently format the notification appropriately (e.g., increase text font size) and transmit the formatted notification to the refrigerator 332, the microwave 334, and the stove 336. The refrigerator 332, the microwave 334, and the stove 336 can then display the formatted notification (e.g., legible text with a large font size) to the target user 320. Accordingly, even though the notification originated at the tablet 342, which is remote from the target user 320 in the kitchen 302, the adaptive notification network can use various nodes (in this case, the refrigerator 332, the microwave 334, and the stove 336) to deliver the notification to the target user 330 in an appropriate or desirable manner (in this case, larger text for a near-sighted user).

Figure 3B:
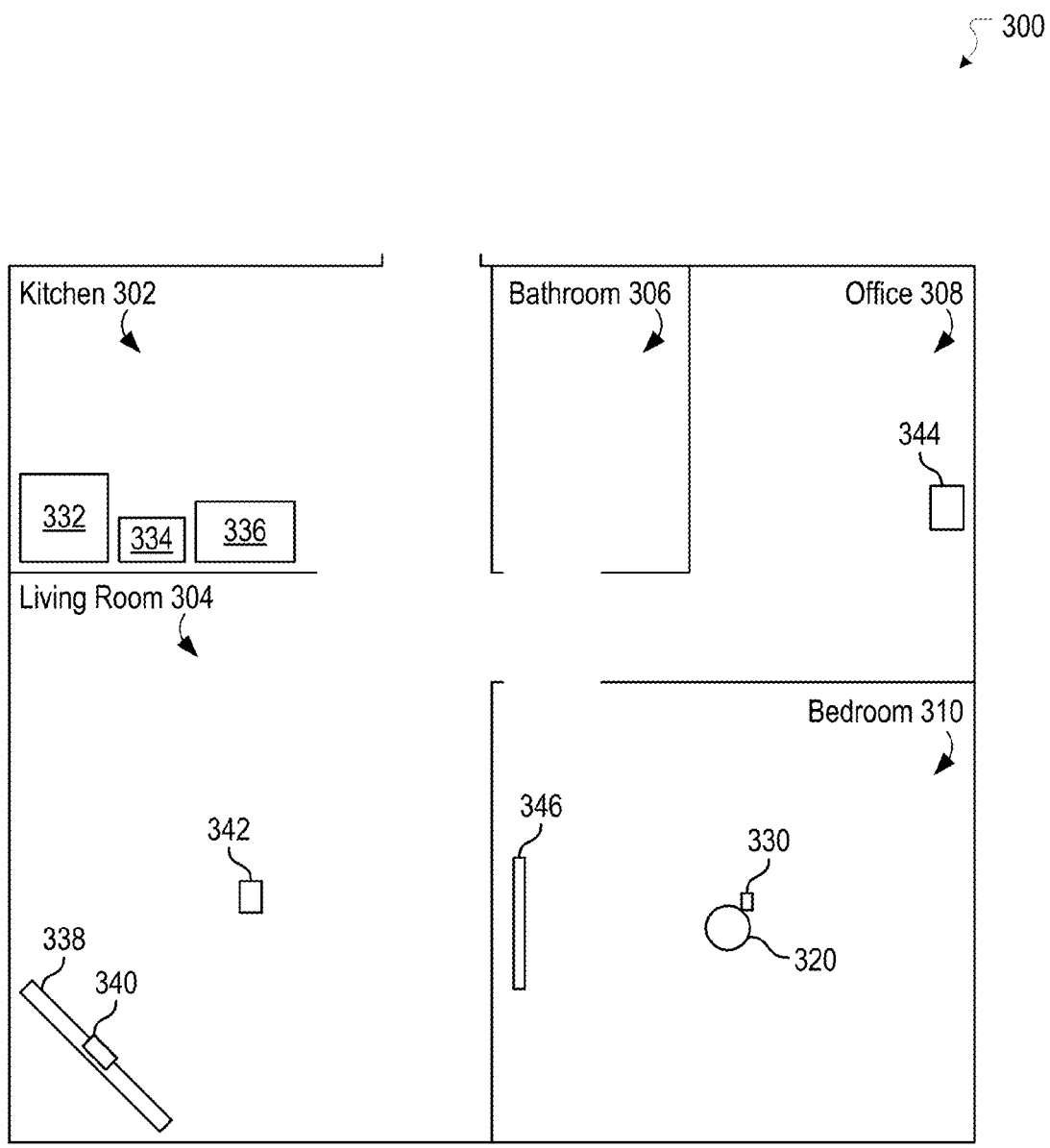
FIG. 3B illustrates the example scenario of FIG. 3A in which an example adaptive notification network can be utilized, according to an embodiment of the present disclosure.

FIG. 3B illustrates the example scenario 300 of FIG. 3A in which an example adaptive notification network can be utilized, according to an embodiment of the present disclosure. In FIG. 3B, the user 320 can go to a different room, such as the bedroom 310. In one example, the refrigerator 332 can have one or more sensors to detect when and for how long a refrigerator door is left open. The refrigerator 332 can generate a notification to be provided to the user 320 indicating that the refrigerator door has been left open for more than a threshold amount of time. In this example, the target user of the refrigerator door notification can be the user 320, who is now in the bedroom 310. The content of the notification can specify that the refrigerator door has been left open. The priority of the refrigerator door notification can be medium or high, in this example.

Based on the acquired information related to the user 320 and the acquired information related to the nodes, both of which are updated over time, the notification server can recognize that the user 320 is in the bedroom 310 and so is the bedroom TV 346. In this example, the notification server can rank the bedroom TV 346 as the highest notification node. The notification server can then select the bedroom TV 346 and format the refrigeration door notification as, for example, an automated vocal message and an legible message in large font size compatible to be played and displayed, respectively, on the bedroom TV 346 for the target user 320 to hear and see, respectively. Similarly, if a notification intended for user 320 is generated from the tablet computer 342, the notification server can transmit the notification to be delivered at the bedroom TV 346 while the target user is in the bedroom 310.

Figure 3C:
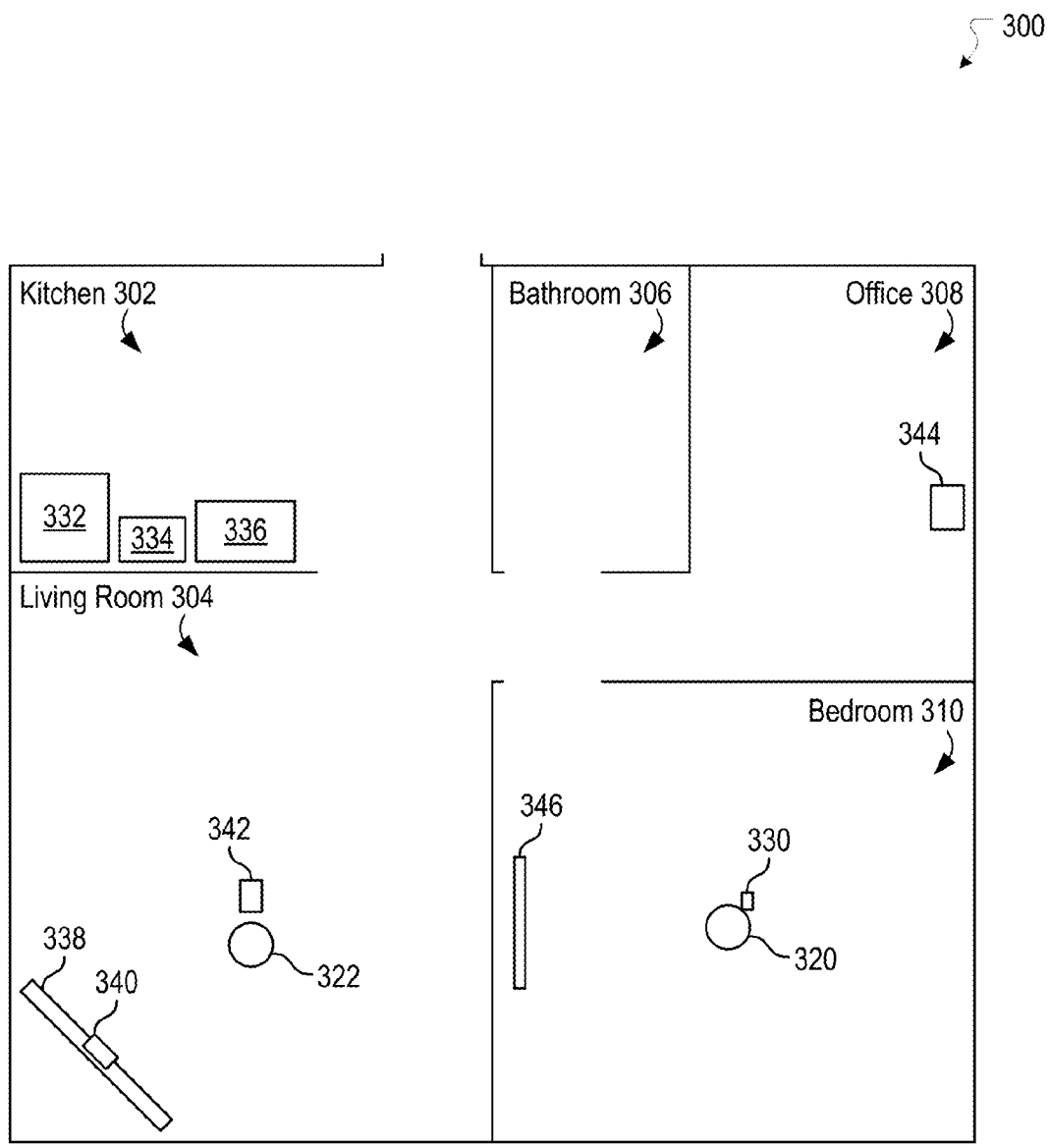
FIG. 3C illustrates the example scenario of FIG. 3B in which an example adaptive notification network can be utilized, according to an embodiment of the present disclosure.

FIG. 3C illustrates the example scenario 300 of FIG. 3B in which an example adaptive notification network can be utilized, according to an embodiment of the present disclosure. In FIG. 3C, there can be another user 322 (i.e., a second user 322). Various embodiments of the present disclosure can distinguish between multiple users (e.g., user 320 and user 322) of the notification network and can provide notifications to the correct target user in a manner suited for the particular target user.

In some embodiments, a notification node can utilize facial recognition techniques and/or vocal recognition techniques to determine identifies of target users, which can facilitate in distinguishing between multiple target users. In some embodiments, cameras, microphones, and/or other various sensors can be used to obtain information related to target users (and nodes). For example, a microphone array on a gaming console can be utilized for voice recognition, can determine background noise levels, and/or can estimate an approximate location of a user when the user is talking. In another example, a camera on a computing device can assist in identifying users using facial recognition techniques, determining users' locations, and/or determining ambient light levels.

In the example of FIG. 3C, the tablet computer 342, the living room TV 338, and/or the media entertainment system 340 can each facilitate in determining the location of the second user 322. Information about the second user 322 (including the second user's location) can be acquired by the notification server. Similar to previous discussions, the notification server can rank the nodes and decide that notifications intended for the second user 322 are to be delivered via the living room TV 338, the media entertainment system 340, and/or the tablet computer 342 because these nodes are close in proximity to the second user 322.

Figure 4:
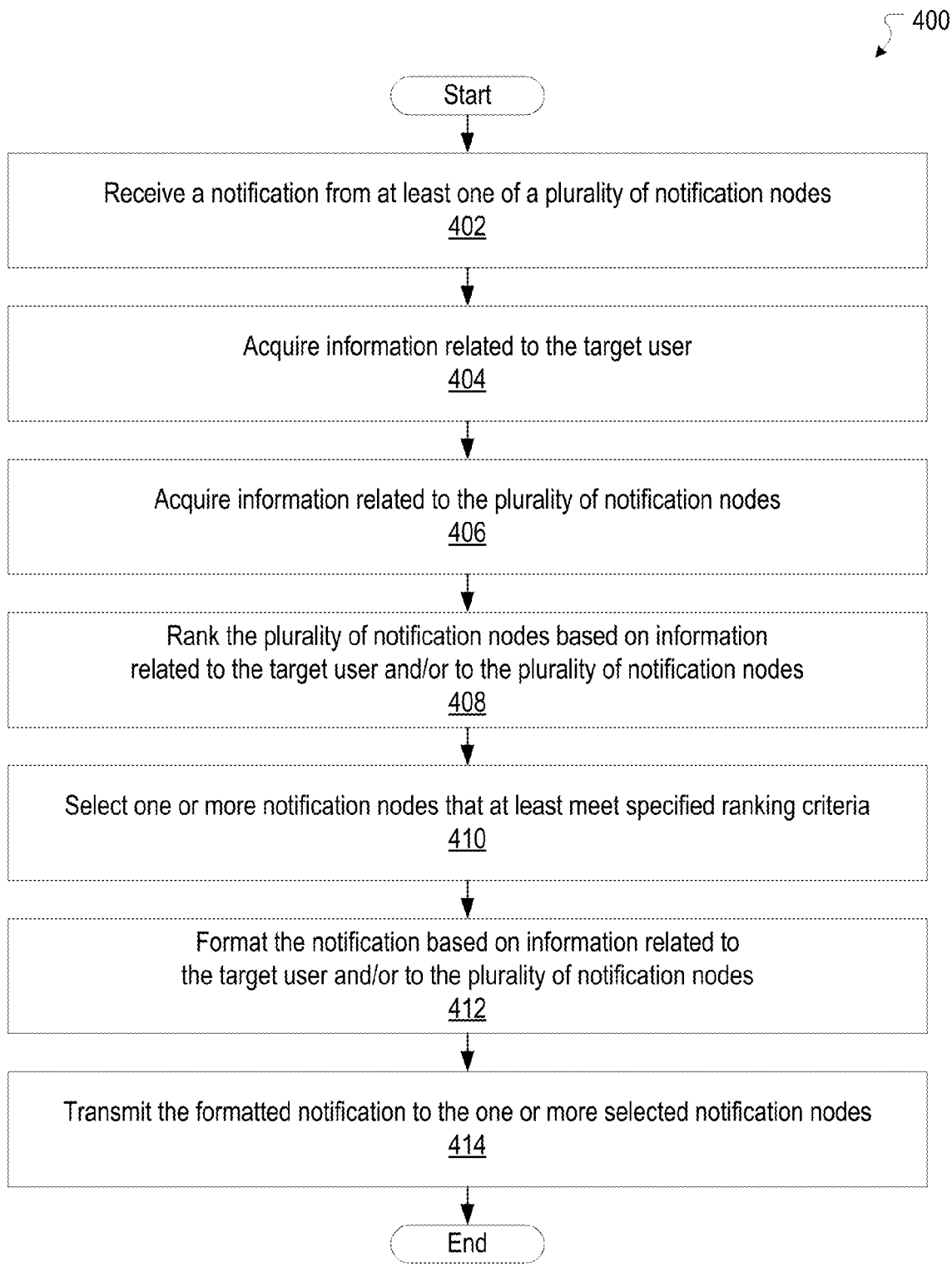
FIG. 4 illustrates an example method embodiment for utilizing an adaptive notification network, according to an embodiment of the present disclosure.

FIG. 4 illustrates an example method embodiment 400 for utilizing an adaptive notification network, according to an embodiment of the present disclosure. It should be understood that there can be additional, fewer, or alternative steps performed in similar or alternative orders, or in parallel, within the scope of the various embodiments unless otherwise stated. At step 402, the example method embodiment 400 can receive a notification from at least one of the plurality of notification nodes. The notification can be associated with a target user.

Step 404 can include acquiring information related to the target user. Step 406 can include acquiring information related to the plurality of notification nodes. In some embodiments, steps 404 and 406 can be performed concurrently via parallel processing. In some embodiments, steps 404 and 406 can be performed sequentially (in any order).

The example method 400 can then rank the plurality of notification nodes based on at least one of: 1) the information related to the target user or 2) the information related to the plurality of notification nodes, at step 408. The ranking of the nodes can be performed adaptively and dynamically (e.g., based on the acquired information).

At step 410, the method 400 can select one or more notification nodes that satisfy one or more specified ranking criteria. For example, the method 400 can select the single highest ranked node. In another example, the method 400 can select the top three highest ranked nodes. In a further example, the method 400 can select all nodes having ranking scores higher than a specified threshold.

The method 400 can format the notification based on at least one of: 1) the information related to the target user or 2) information related to the one or more selected notification nodes, at step 412. For example, the notification can be formatted to be delivered or provided based on the target user's capabilities and/or based on the selected nodes' notification capabilities. Step 414 can include transmitting the formatted notification to the one or more selected notification nodes. The selected nodes can then provide or deliver the formatted notification to the target user.

In some embodiments, the notification can be transmitted to multiple nodes to be delivered or provided to the target user. In some embodiments, the notification can be provided or delivered again if the target user has not responded or reacted to the notification within a duration of time. These and other variations can increase the likelihood that the target user will recognize or become aware of the notification.

Various embodiments of the present disclosure can also enable the adaptive notification network to extend beyond a user's home. In one example, various other devices or systems outside the user's home (e.g., in the user's car, at the user's workplace, the user's friend's devices/system, etc.) can be incorporated into the notification network. Moreover, in some embodiments, the adaptive notification network can extend beyond users who have joined (e.g., are associated with, have subscribed to, are registered with, etc.) the notification network. In another example, a target user can instruct the notification server to transmit notifications to a designated user other than the target user. In some implementations, multiple notification networks can share information among themselves. For example, a notification network can pass a fire alarm message or signal to one or more other notification networks.

It is further contemplated that there can be many other possible uses, applications, and/or variations associated with the various embodiments of the present disclosure.

Hardware Implementation

Figure 5:
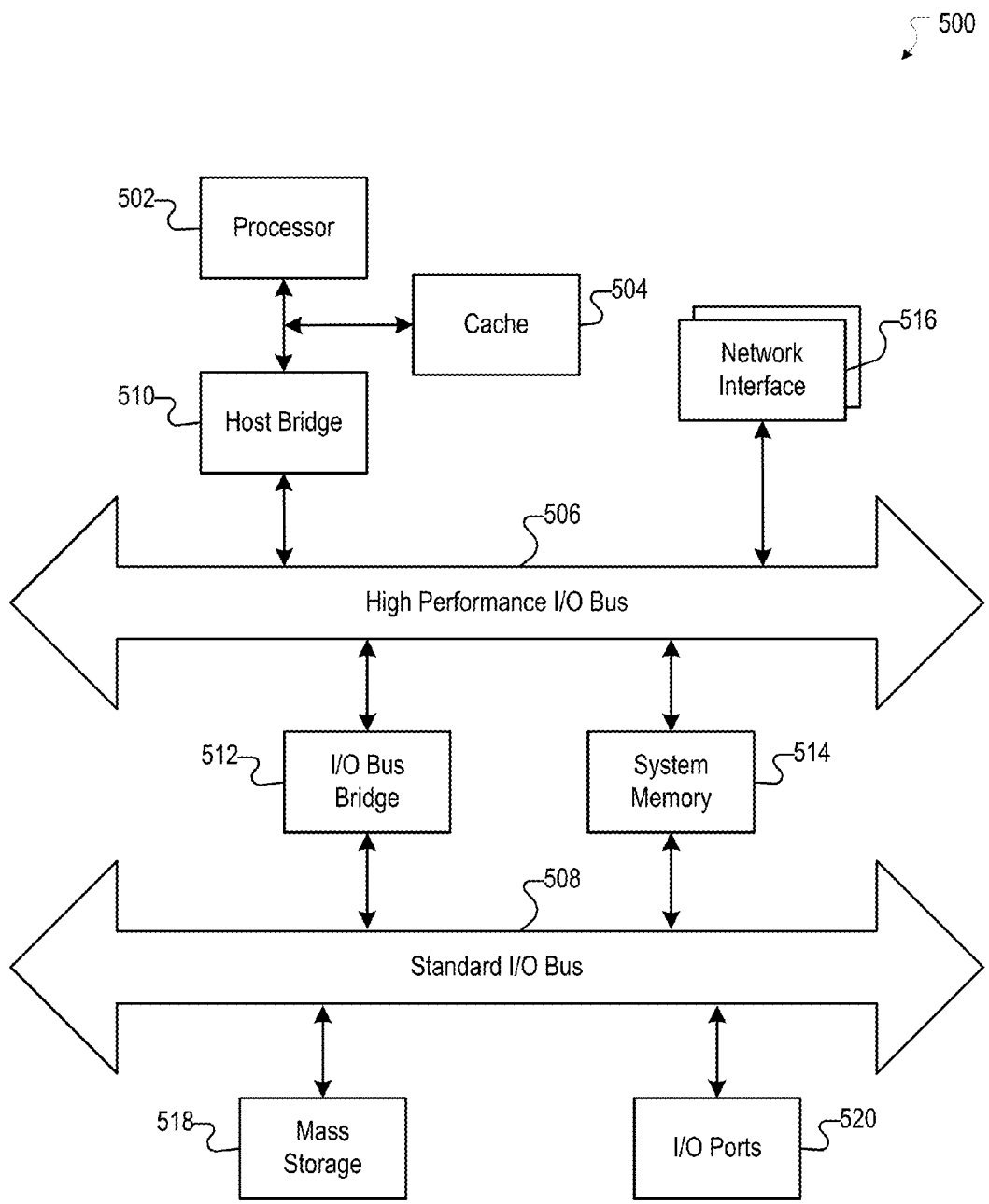
FIG. 5 illustrates an example of a computing device or system that can be used to implement one or more of the embodiments described herein, according to an embodiment of the present disclosure.

The foregoing processes and features can be implemented by a wide variety of machine and computer system architectures and in a wide variety of network and computing environments. FIG. 5 illustrates an example of a computer system 500 that may be used to implement one or more of the embodiments described herein in accordance with an embodiment of the invention. The computer system 500 includes sets of instructions for causing the computer system 500 to perform the processes and features discussed herein. The computer system 500 may be connected (e.g., networked) to other machines. In a networked deployment, the computer system 500 may operate in the capacity of a server machine or a client machine in a client-server network environment, or as a peer machine in a peer-to-peer (or distributed) network environment. In an embodiment of the invention, the computer system 500 may be a component of the networking system described herein. In an embodiment of the present disclosure, the computer system 500 may be one server among many that constitutes all or part of a networking system.

In some embodiments, the computer system 500 can be implemented as a notification server (e.g., 102 in FIG. 1) or a notification node (e.g., 104, 106, 108, 110 in FIG. 1), within an adaptive notification network (e.g., 100 in FIG. 1). For example, the computer system 500 can correspond to one of: the smart phone 330 in FIG. 3A through FIG. 3C, the refrigerator 332, the microwave 334, the stove 336, the living room TV 338, the media entertainment box 340, the tablet computer 342, the laptop or desktop computer 344, or the bedroom TV.

The computer system 500 can include a processor 502, a cache 504, and one or more executable modules and drivers, stored on a computer-readable medium, directed to the processes and features described herein. Additionally, the computer system 500 may include a high performance input/output (I/O) bus 506 or a standard I/O bus 508. A host bridge 510 couples processor 502 to high performance I/O bus 506, whereas I/O bus bridge 512 couples the two buses 506 and 508 to each other. A system memory 514 and one or more network interfaces 516 couple to high performance I/O bus 506. The computer system 500 may further include video memory and a display device coupled to the video memory (not shown). Mass storage 518 and I/O ports 520 couple to the standard I/O bus 508. The computer system 500 may optionally include a keyboard and pointing device, a display device, or other input/output devices (not shown) coupled to the standard I/O bus 508. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 500, including the input and output of data to and from software applications (not shown). The operating system provides an interface between the software applications being executed on the system and the hardware components of the system. Any suitable operating system may be used, such as the LINUX Operating System, the Apple Macintosh Operating System and/or Apple iOS, available from Apple Computer Inc. of Cupertino, Calif., UNIX operating systems, Microsoft® Windows® operating systems, BSD operating systems, Google Android, Samsung Tizen, and the like. Other implementations are possible.

The elements of the computer system 500 are described in greater detail below. In particular, the network interface 516 provides communication between the computer system 500 and any of a wide range of networks, such as an Ethernet (e.g., IEEE 802.3) network, a backplane, etc. The mass storage 518 provides permanent storage for the data and programming instructions to perform the above-described processes and features implemented by the respective computing systems identified above, whereas the system memory 514 (e.g., DRAM) provides temporary storage for the data and programming instructions when executed by the processor 502. The I/O ports 520 may be one or more serial and/or parallel communication ports that provide communication between additional peripheral devices, which may be coupled to the computer system 500.

The computer system 500 may include a variety of system architectures, and various components of the computer system 500 may be rearranged. For example, the cache 504 may be on-chip with processor 502. Alternatively, the cache 504 and the processor 502 may be packed together as a "processor module", with processor 502 being referred to as the "processor core". Furthermore, certain embodiments of the invention may neither require nor include all of the above components. For example, peripheral devices coupled to the standard I/O bus 508 may couple to the high performance I/O bus 506. In addition, in some embodiments, only a single bus may exist, with the components of the computer system 500 being coupled to the single bus. Furthermore, the computer system 500 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 500 that, when read and executed by one or more processors, cause the computer system 500 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 500, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 502. Initially, the series of instructions may be stored on a storage device, such as the mass storage 518. However, the series of instructions can be stored on any suitable computer readable storage medium. Furthermore, the series of instructions need not be stored locally, and could be received from a remote storage device, such as a server on a network, via the network interface 516. The instructions are copied from the storage device, such as the mass storage 518, into the system memory 514 and then accessed and executed by the processor 502. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 500 to perform any one or more of the processes and features described herein.

Figure 6:
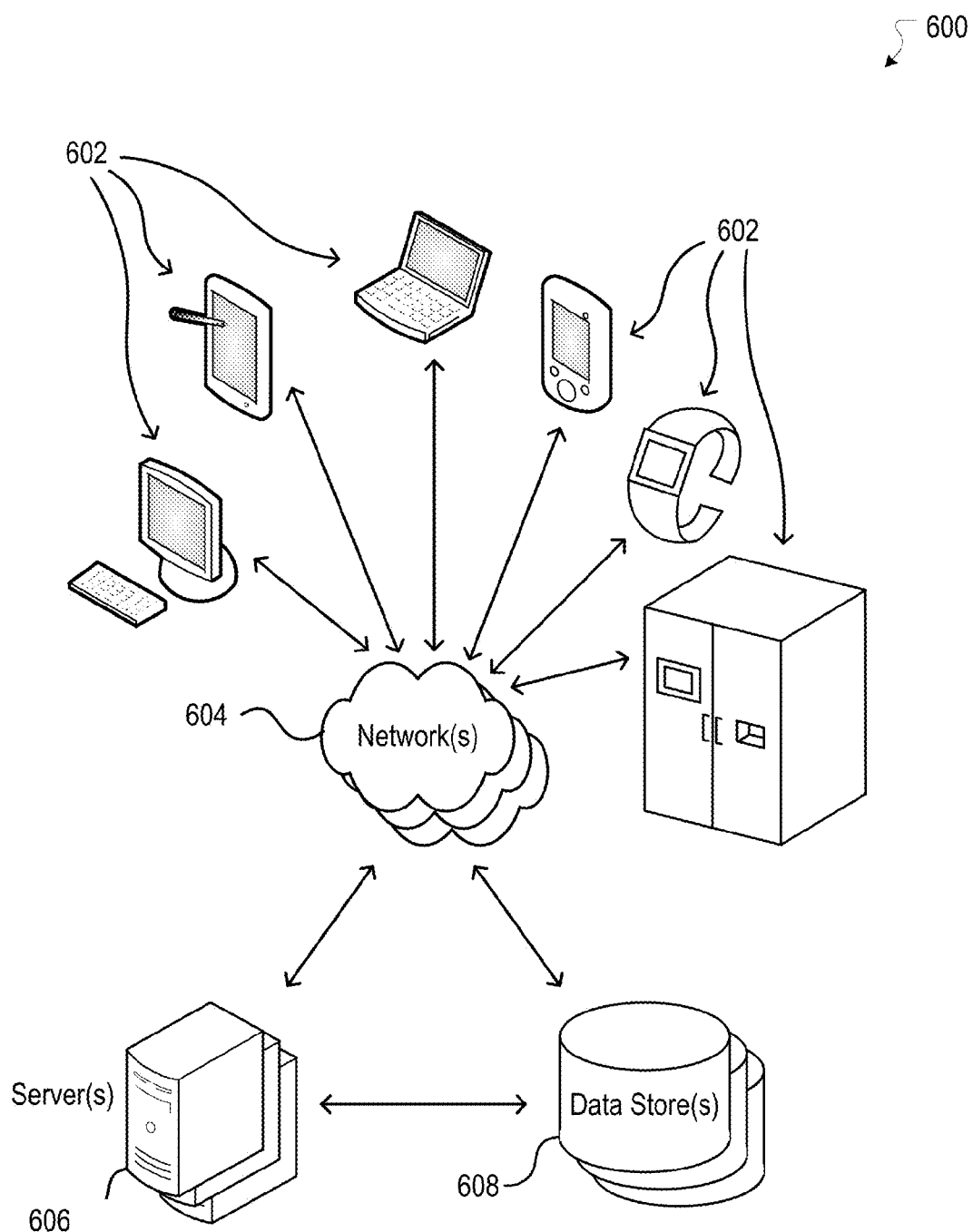
FIG. 6 illustrates a network environment in which various embodiments can be implemented.

As discussed, different approaches can be implemented in various environments in accordance with the described embodiments. For example, FIG. 6 illustrates an example network system embodiment (or network environment) 600 for implementing aspects in accordance with various embodiments. The example network system 600 can include one or more computing devices, computing systems, electronic devices, client devices, etc. (e.g., 602). In some instances, each of these devices and/or systems 602 can correspond to the computer system 500 in FIG. 5. The example network system 600 can also include one or more networks 604. Further, there can be one or more servers 606 and one or more data stores 608 in the network system 600.

As shown in FIG. 6, the one or more example computing devices (i.e., computing systems, electronic devices, client devices, etc.) 602 can be configured to transmit and receive information to and from various components via the one or more networks 604. For example, multiple computing devices 602 can communicate with one another via a Bluetooth network (e.g., 604). In another example, multiple computing devices 602 can communicate with one another via the Internet (e.g., 604). In a further example, multiple computing devices 602 can communicate with one another via a local area network (e.g., 604).

In some embodiments, examples of computing devices 602 can include (but are not limited to) personal computers, desktop computers, laptop/notebook computers, tablet computers, electronic book readers, mobile phones, cellular phones, smart phones, handheld messaging devices, personal data assistants (PDAs), set top boxes, cable boxes, video gaming systems, smart televisions, smart appliances, smart cameras, wearable devices, etc. In some cases, a computing device 602 can include any device and/or system having a processor. In some case, a computing device 602 can include any device and/or system configured to communicate via the one or more networks 604.

Moreover, regarding the computing devices 602, various hardware elements associated with the computing devices 602 can be electrically coupled via a bus. As discussed above, elements of computing devices 602 can include, for example, at least one processor (e.g., central processing unit (CPU)), at least one input device (e.g., a mouse, keyboard, button, microphone, touch sensor, controller, etc.), and at least one output device (e.g., a display screen, speaker, ear/head phone port, tactile/vibration element, printer, etc.). The computing device 602 can also include one or more storage devices. For example, the computing device 602 can include optical storage devices, disk drives, and solid-state storage devices (e.g., random access memory ("RAM"), read-only memory ("ROM"), etc.). In another example, the computing device 602 can include portable or removable media devices, flash cards, memory cards, etc.

Further, the computing device(s) 602 can include a computer-readable storage media reader, a communications device (e.g., a modem, a network card (wireless or wired), an infrared communication device, etc.). The computer-readable storage media reader can be capable of connecting with or receiving a computer-readable storage medium. The computer-readable storage medium can, in some cases, represent various storage devices and storage media for temporarily and/or more permanently storing, interacting with, and accessing data. The communications device can facilitate in transmitting and/or receiving data via the network(s) 604.

In some embodiments, the computing device 602 can utilize software modules, services, and/or other elements residing on at least one memory device of the computing device 602. In some embodiments, the computing device 602 can utilize an operating system (OS) and/or a program. For example, the computing device 602 can utilize a web browsing application to interact with and/or access various data (e.g., content) via the network(s) 604. It should be understood that numerous variations and applications are possible for the various embodiments disclosed herein.

In some embodiments, examples of the one or more networks 604 can include (but are not limited to) an intranet, a local area network (LAN, WLAN, etc.), a cellular network, the Internet, and/or any combination thereof. Components used for implementing the network system 600 can depend at least in part upon a type(s) of network(s) and/or environment(s). A person of ordinary skill in the art would recognize various protocols, mechanisms, and relevant parts for communicating via the one or more networks 604. In some instances, communication over the network(s) 604 can be achieved via wired connections, wireless connections (WiFi, WiMax, Bluetooth, radio-frequency communications, near field communications, etc.), and/or combinations thereof.

In some embodiments, the one or more networks 604 can include the Internet, and the one or more servers 606 can include one or more web servers. The one or more web servers can be configured to receive requests and provide responses, such as by providing data and/or content based on the requests. In some cases, the web server(s) can utilize various server or mid-tier applications, including HTTP servers, CGI servers, FTP servers, Java servers, data servers, and business application servers. The web server(s) can also be configured to execute programs or scripts in reply to requests from the computing devices 602. For example, the web server(s) can execute at least one web application implemented as at least one script or program. Applications can be written in various suitable programming languages, such as Java®, JavaScript, C, C# or C++, Python, Perl, TCL, etc., and/or combinations thereof.

In some embodiments, the one or more networks 604 can include a local area network, and the one or more servers 606 can include a server(s) within the local area network. In one example, a computing device 602 within the network(s) 604 can function as a server. Various other embodiments and/or applications can also be implemented.

In some embodiments, the one or more servers 606 in the example network system 600 can include one or more application servers. Furthermore, the one or more applications servers can also be associated with various layers or other elements, components, processes, which can be compatible or operable with one another.

In some embodiments, the network system 600 can also include one or more data stores 608. The one or more servers (or components within) 606 can be configured to perform tasks such as acquiring, reading, interacting with, modifying, or otherwise accessing data from the one or more data stores 608. In some cases, the one or more data stores 608 can correspond to any device/system or combination of devices/systems configured for storing, containing, holding, accessing, and/or retrieving data. Examples of the one or more data stores 608 can include (but are not limited to) any combination and number of data servers, databases, memories, data storage devices, and data storage media, in a standard, clustered, and/or distributed environment.

The one or more application servers can also utilize various types of software, hardware, and/or combinations thereof, configured to integrate or communicate with the one or more data stores 608. In some cases, the one or more application servers can be configured to execute one or more applications (or features thereof) for one or more computing devices 602. In one example, the one or more applications servers can handle the processing or accessing of data and business logic for an application(s). Access control services in cooperation with the data store(s) 608 can be provided by the one or more application servers. The one or more application servers can also be configured to generate content such as text, media, graphics, audio and/or video, which can be transmitted or provided to a user (e.g., via a computing device 602 of the user). The content can be provided to the user by the one or more servers 606 in the form of HyperText Markup Language (HTML), Extensible HyperText Markup Language (XHTML), Extensible Markup Language (XML), or various other formats and/or languages. In some cases, the application server can work in conjunction with the web server. Requests, responses, and/or content delivery to and from computing devices 602 and the application server(s) can be handled by the web server(s). It is important to note that the one or more web and/or application servers (e.g., 606) are included in FIG. 6 for illustrative purposes.

In some embodiments, the one or more data stores 608 can include, for example, data tables, memories, databases, or other data storage mechanisms and media for storing data. For example, the data store(s) 608 can include components configured to store application data, web data, user information, session information, etc. Various other data, such as page image information and access rights information, can also be stored in the one or more data stores 608. The one or more data stores 608 can be operable to receive instructions from the one or more servers 606. The data stores 608 can acquire, update, process, or otherwise handle data in response to instructions.

In some instances, the data store(s) 608 can reside at various network locations. For example, the one or more data stores 608 can reside on a storage medium that is local to and/or resident in one or more of the computing devices 602. The data store(s) 608 can also reside on a storage medium that is remote from the devices of the network(s) 604. Furthermore, in some embodiments, information can be stored in a storage-area network ("SAN"). In addition, data useful for the computing devices 602, servers 606, and/or other network components can be stored locally and/or remotely.

In one example, a user of a computing device 602 can perform a search request using the computing device 602. In this example, information can be retrieved and provided to the user (via the computing device 602) in response to the search request. The information can, for example, be provided in the form of search result listings on a web page that is rendered by a browsing application running on the computing device 602. In some cases, the one or more data stores 608 can also access information associated with the user (e.g., the identity of the user, search history of the user, etc.) and can obtain search results based on the information associated with the user.

Moreover, in some embodiments, the one or more servers 606 can each run an operating system (OS). The OS running on a respective server 606 can provide executable instructions that facilitate the function and performance of the server. Various functions, tasks, and features of the one or more servers 606 are possible and thus will not be discussed herein in detail. Similarly, various implementations for the OS running on each server are possible and therefore will not be discussed herein in detail.

In some embodiments, various aspects of the present disclosure can also be implemented as one or more services, or at least a portion thereof. Services can communicate using many types of messaging, such as HTML, XHTML, XML, Simple Object Access Protocol (SOAP), etc. Further, various embodiments can utilize network communicational protocols, such as TCP/IP, OSI, FTP, UPnP, NFS, CIFS, etc. Examples of the one or more networks 604 can further include wide-area networks, virtual private networks, extranets, public switched telephone networks, infrared networks, and/or any combinations thereof.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

It should also be appreciated that the specification and drawings are to be regarded in an illustrative sense. It can be evident that various changes, alterations, and modifications can be made thereunto without departing from the broader spirit and scope of the disclosed technology.

Moreover, the language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A system comprising:
   at least one processor; and
   a memory storing instructions that, when executed by the at least one processor, cause the system to perform:
   receiving a first notification from at least one of a plurality of notification nodes, the first notification being a first particular notification for a target user;
   acquiring information related to the target user, wherein the information related to the target user includes one or more physical capabilities of the target user;
   selecting a first set of one or more notification nodes that satisfy one or more specified ranking criteria based upon the information related to the target user, wherein a first notification node of the first set of one or more notification nodes determines an identity of the target user using at least one of facial recognition or vocal recognition;
   transmitting the first notification to the first set of one or more selected notification nodes; and
   selecting a second set of one or more notification nodes based on a determination that the target user did not acknowledge the first notification on the first set of one or more selected notification nodes, wherein the one or more notification nodes of the first set are not included in the second set; and
   wherein a second notification node of the second set of one or more notification nodes determines an identity of a second target user using at least one of facial recognition or vocal recognition; and
   transmitting a second notification to the second target user, wherein the second notification is a second particular notification for the second target user.

2. The system of claim 1, further comprising acquiring information related to the plurality of notification nodes, and ranking the plurality of notification nodes based on the information related to the target user, wherein at least one of ranking the plurality of notification nodes, selecting the first set of one or more notification nodes, or formatting the first notification is performed dynamically.

3. The system of claim 1, further comprising:
   receiving a communication indicating that information related to one or more of the plurality of notification nodes has changed; and
   updating the information related to the one or more of the plurality of notification nodes based on the communication.

4. The system of claim 1, wherein the information related to the plurality of notification nodes indicates at least one of a current context of each of the plurality of notification nodes or a notification capability of each of the plurality of notification nodes.

5. The system of claim 1, wherein the information related to the target user includes a current context in which the target user is situated.

6. The system of claim 5, wherein the current context in which the target user is situated indicates at least one of a current location of the target user, a current environment in which the target user is situated, a noise level of the current environment in which the target user is situated, or an ambient light level of the current environment in which the target user is situated.

7. The system of claim 6, wherein the current location of the target user is a relative location with respect to one or more locations of at least a subset of the plurality of notifications nodes.

8. The system of claim 6, wherein the current location of the target user is determined using, at least in part, one or more sensors of at least a subset of the plurality of notification nodes.

9. The system of claim 6, wherein formatting the first notification further comprises at least one of:

preparing the first notification to be audibly provided to the target user when the noise level of the current environment is below a specified noise level threshold; or preparing the first notification to be visually provided to the target user when the ambient light level of the current environment is below a specified ambient light level threshold.

10. The system of claim 1, wherein the information related to the target user includes at least one of an age of the target user, one or more preferred languages of the target user, or one or more preferences of the target user.

11. The system of claim 1, further comprising:
receiving a communication indicating that information related to the target user has changed; and
updating the information related to the target user based on the communication.

12. The system of claim 1, further comprising:
receiving feedback from the target user; and
updating the information related to the target user based on the feedback.

13. The system of claim 1, further comprising a notification server that corresponds to at least one of the plurality of notification nodes.

14. The system of claim 1, further comprising:
formatting the first notification based on at least one of the information related to the target user or information related to the first set of one or more selected notification nodes; and
transmitting the formatted first notification to a computing device designated by the target user.

15. The system of claim 1, further comprising ranking the plurality of notification nodes based on the information related to the plurality of notification nodes.

16. A computer-implemented method comprising:
receiving, by a computer system, a first notification from at least one of a plurality of notification nodes, the first notification being a first particular notification for a target user;
acquiring, by the computer system, information related to the target user, wherein the information related to the target user includes one or more physical capabilities of the target user;
selecting, by the computer system, a first set of one or more notification nodes that satisfy one or more specified ranking criteria based on the information related to the target user, wherein a first notification node of the first set of one or more notification nodes determines an identity of the target user using at least one of facial recognition or vocal recognition;
transmitting, by the computer system, the first notification to the first set of one or more selected notification nodes;
selecting, by the computer system, a second set of one or more notification nodes based on a determination that the target user did not acknowledge the first notification on the first set of one or more selected notification nodes, wherein the one or more notification nodes of the first set are not included in the second set;
determining, by a second notification node of the second set of one or more notification nodes, an identity of a second target user using at least one of facial recognition or vocal recognition; and
transmitting a second notification to the second target user, wherein the second notification is a second particular notification for the second target user.

17. The computer-implemented method of claim 16, wherein at least one of ranking the plurality of notification nodes, selecting the first set of one or more notification nodes, or formatting the first notification is performed dynamically.

18. The computer-implemented method of claim 16, wherein the information related to the plurality of notification nodes indicates at least one of a current context of each of the plurality of notification nodes or a notification capability of each of the plurality of notification nodes.

19. The computer-implemented method of claim 16, wherein the information related to the target user includes at least one of a current context in which the target user is situated, an age of the target user, one or more preferred languages of the target user, or one or more preferences of the target user.

20. A non-transitory computer-readable storage medium including instructions that, when executed by at least one processor of a computing system, cause the computing system to perform:
receiving a first notification from at least one of the plurality of notification nodes, the first notification being a first particular notification for a target user;
acquiring information related to the target user, wherein the information related to the target user includes one or more physical capabilities of the target user;
selecting a first set of one or more notification nodes that satisfy one or more specified ranking criteria based on the information related to the target user, wherein a first notification node of the first set of one or more notification nodes determines an identity of the target user using at least one of facial recognition or vocal recognition;
transmitting the first notification to the first set of one or more selected notification nodes;
selecting a second set of one or more notification nodes based on a determination that the target user did not acknowledge the first notification on the first set of one or more selected notification nodes, wherein
the one or more notification nodes of the first set are not included in the second set;
determining, by a second notification node of the second set of one or more notification nodes, an identity of a second target user using at least one of facial recognition or vocal recognition; and
transmitting a second notification to the second target user, wherein the second notification is a second particular notification for the second target user.

21. The non-transitory computer-readable storage medium of claim 20, wherein at least one of ranking the plurality of notification nodes, selecting the first set of one or more notification nodes, or formatting the first notification is performed dynamically.

* * * * *